US012749731B2

(12) United States Patent
Park et al.

(10) Patent No.: US 12,749,731 B2
(45) Date of Patent: Sep. 29, 2026

(54) BATTERY MODULE AND BATTERY PACK INCLUDING THE SAME

(71) Applicant: LG Energy Solution, Ltd., Seoul (KR)

(72) Inventors: Won Kyoung Park, Daejeon (KR); Junyeob Seong, Daejeon (KR); Subin Park, Daejeon (KR); Honggoo Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 701 days.

(21) Appl. No.: 18/021,542

(22) PCT Filed: Jan. 7, 2022

(86) PCT No.: PCT/KR2022/000284
§ 371 (c)(1),
(2) Date: Feb. 15, 2023

(87) PCT Pub. No.: WO2022/149900
PCT Pub. Date: Jul. 14, 2022

(65) Prior Publication Data

US 2023/0307739 A1 Sep. 28, 2023

(30) Foreign Application Priority Data

Jan. 11, 2021 (KR) ........................ 10-2021-0003177

(51) Int. Cl.
*H01M 10/653* (2014.01)
*H01M 10/48* (2006.01)
(Continued)

(52) U.S. Cl.
CPC ....... *H01M 10/653* (2015.04); *H01M 10/482* (2013.01); *H01M 50/211* (2021.01); *H01M 50/548* (2021.01)

(58) Field of Classification Search
CPC ............ H01M 10/653; H01M 10/482; H01M 50/211; H01M 50/548
See application file for complete search history.

(56) References Cited

U.S. PATENT DOCUMENTS 10,270,137 B1 4/2019 Pounds
2006/0093890 A1 5/2006 Steinbroner
(Continued)

FOREIGN PATENT DOCUMENTS

CN 103518274 A 1/2014
CN 110165113 A 8/2019
(Continued)

OTHER PUBLICATIONS

Machine translation of KR102032356B1, Kim Hyun Chan. (Year: 2019).*
(Continued)

*Primary Examiner* — Mayla Gonzalez Ramos
(74) *Attorney, Agent, or Firm* — BRYAN CAVE LEIGHTON PAISNER LLP

(57) ABSTRACT

A battery module and a battery pack including the same are provided. The battery module comprises a battery cell stack in which a plurality of battery cells including electrode leads are stacked; a first sensing block and a second sensing block configured to respectively cover a front side and a rear side of the battery cell stack from which the electrode leads protrude; and an elastic member configured to cover the first sensing block, the second sensing block, and two opposite lateral sides of the battery cell stack.

13 Claims, 11 Drawing Sheets

(51) Int. Cl.
*H01M 50/211* (2021.01)
*H01M 50/548* (2021.01)

(56) References Cited

U.S. PATENT DOCUMENTS

| | | | | |
|---|---|---|---|---|
| 2012/0183840 | A1 | 7/2012 | Lee et al. | |
| 2013/0309543 | A1* | 11/2013 | Kim | H01M 50/262 429/120 |
| 2014/0087231 | A1 | 3/2014 | Schaefer et al. | |
| 2015/0064540 | A1 | 3/2015 | Roh et al. | |
| 2015/0280184 | A1 | 10/2015 | Utley et al. | |
| 2019/0036091 | A1 | 1/2019 | Lee et al. | |
| 2019/0260099 | A1 | 8/2019 | Ju et al. | |
| 2020/0067040 | A1 | 2/2020 | Kim et al. | |
| 2020/0136119 | A1 | 4/2020 | Weinberger et al. | |
| 2020/0373634 | A1 | 11/2020 | Choi | |
| 2021/0057689 | A1 | 2/2021 | Park et al. | |
| 2022/0149478 | A1 | 5/2022 | Egashira et al. | |
| 2025/0167361 | A1 | 5/2025 | He et al. | |

FOREIGN PATENT DOCUMENTS

| | | | | |
|---|---|---|---|---|
| CN | 110168799 | A | 8/2019 | |
| EP | 3926733 | A1 | 12/2021 | |
| JP | 2013026090 | | 2/2013 | |
| JP | 2013519214 | | 5/2013 | |
| JP | 2015520922 | | 7/2015 | |
| JP | 2020505723 | | 2/2020 | |
| JP | 2020173890 | | 10/2020 | |
| KR | 10-1722183 | B1 | 3/2017 | |
| KR | 10-2017-0066896 | A | 6/2017 | |
| KR | 10-1776898 | B1 | 9/2017 | |
| KR | 20180044099 | A | 5/2018 | |
| KR | 20180135701 | A | 12/2018 | |
| KR | 10-2032356 | B1 | 11/2019 | |
| KR | 10-2020-0012296 | A | 2/2020 | |
| KR | 20200015207 | A * | 2/2020 | H01M 10/613 |
| KR | 10-2020-0021609 | A | 3/2020 | |
| KR | 10-2020-0030967 | A | 3/2020 | |
| KR | 10-2020-0049587 | A | 5/2020 | |
| KR | 10-2020-0058218 | A | 5/2020 | |
| KR | 10-2020-0068479 | A | 6/2020 | |
| KR | 10-2148993 | B1 | 8/2020 | |
| KR | 10-2021-0000551 | A | 1/2021 | |
| WO | 2020194966 | | 10/2020 | |

OTHER PUBLICATIONS

Machine translation of KR-20200015207-A, Kim Hyun Seok. (Year: 2020).*

* cited by examiner

BATTERY MODULE AND BATTERY PACK INCLUDING THE SAME

CROSS-REFERENCE TO RELATED APPLICATION(S)

This application is a National Stage Application of International Application No. PCT/KR2022/000284, filed on Jan. 7, 2022, which claims priority to and the benefit of Korean Patent Application No. 10-2021-0003177 filed on Jan. 11, 2021, the entire disclosures of which are incorporated herein by reference in their entirety.

FIELD OF DISCLOSURE

The present disclosure relates to a battery module and a battery pack including the same, and more particularly, to a battery module with improved cooling performance, and a battery pack including the same.

BACKGROUND

In modern society, as portable devices such as mobile phones, laptops, camcorders, and digital cameras are commonly used, the development of technologies related to mobile devices is being actively conducted. In addition, a secondary battery, which is chargeable and dischargeable, is considered as a solution for solving problems such as air pollution caused by gasoline vehicles using fossil fuel in the related art. Thus, the secondary batteries are used as power sources for an electric vehicle (EV), a hybrid electric vehicle (HEV), a plug-in hybrid electric vehicle (P-HEV), and the like, which subsequently increases the need for development of the secondary batteries.

As currently commercially available secondary batteries, there are a nickel cadmium battery, a nickel hydrogen battery, a nickel zinc battery, a lithium secondary battery, and the like. Among these batteries, in comparison with the nickel-based secondary battery, the lithium secondary battery causes almost no memory effect and thus is freely charged or discharged. Further, the lithium secondary battery has a very low self-discharge rate and a high energy density, and thus the lithium secondary battery is in the limelight.

The lithium secondary battery mainly uses lithium-based oxide and carbon materials for a positive electrode active material and a negative electrode active material. The lithium secondary battery includes: an electrode assembly including a positive plate and a negative plate that are respectively coated with the positive electrode active material and the negative electrode active material and disposed with a separator interposed therebetween; and a battery casing configured to seal and accommodate the electrode assembly together with an electrolyte.

In general, the lithium secondary batteries may be classified, depending on shapes of exterior materials, into a can-type secondary battery in which the electrode assembly is embedded in a metal can, and a pouch-type secondary battery in which the electrode assembly is embedded in a pouch configured by an aluminum laminated sheet.

In the case of a secondary battery used for a small-scale device, two or three cells are disposed. In contrast, in the case of a secondary battery used for a middle-scale or large-scale device such as a vehicle, a battery module made by electrically connecting a plurality of battery cells is used. The battery module has an improved capacity and an increased output because the plurality of battery cells constitutes a battery cell stack by being connected to each other in series or in parallel. One or more battery modules may be mounted together with various types of control and protection systems such as a battery disconnect unit (BDU), a battery management system (BMS), and a cooling system, thereby constituting a battery pack.

The battery pack needs to satisfy various functions. First, the battery pack needs to satisfy structural durability against various environments, vibration, impact, and the like. Second, there is a need for high-voltage (HV) connection for electrical connection, and low-voltage (LV) connection in which sensors for evaluating states in the battery module are connected. Lastly, a cooling system is essentially required to cool the battery cells in the battery pack because the battery cells release heat while generating electrical energy.

In respect to the cooling system, when the temperature of the secondary battery is increased to a temperature higher than an appropriate temperature, the performance of the secondary battery may deteriorate, and in severe cases, there is a risk that the secondary battery is exploded or ignited. In particular, the battery module or the battery pack having the plurality of secondary batteries, i.e., the battery cells may more quickly or excessively increase in temperature because the amount of heat generated from the plurality of battery cells is collected in a narrow space. In other words, the battery module made by stacking the plurality of battery cells and the battery pack having the battery module mounted therein may obtain high outputs. However, it is difficult to remove heat generated from the battery cells when the secondary battery is charged and discharged. If the heat in the battery cells is not appropriately dissipated, the degradation of the battery cell accelerates, a lifespan of the secondary battery is shortened, and a likelihood of explosion or ignition increases. Moreover, in the case of the battery module included in the battery pack for a vehicle may be often exposed to direct sunlight or placed in a high-temperature condition such as a summer season or a desert area.

SUMMARY

Technical Problem

The present disclosure has been made in an effort to provide a battery module and a battery pack including the same, the battery module having a novel structure in which cooling performance and heat transfer performance are improved and a sensing block capable of guiding high-voltage (HV) connection and low-voltage (LV) connection is provided.

However, the object to be achieved by the embodiments of the present disclosure is not limited to the above-mentioned object but may be variously expanded without departing from the technical spirit of the present disclosure.

Technical Solution

An exemplary embodiment of the present disclosure provides a battery module including: a battery cell stack in which a plurality of battery cells including electrode leads are stacked; a first sensing block and a second sensing block configured to respectively cover a front side and a rear side of the battery cell stack from which the electrode leads protrude; and an elastic member configured to cover the first sensing block, the second sensing block, and two opposite lateral sides of the battery cell stack.

The elastic member may be continuously formed along the first sensing block, the second sensing block, and the two opposite lateral sides of the battery cell stack.

The first sensing block, the battery cell stack, and the second sensing block may be fixed together by the elastic member An upper side and a lower side of the battery cell stack may be exposed.

The battery module may further include lateral pads positioned between the elastic member and the two opposite lateral sides of the battery cell stack.

The electrode leads may include a first electrode lead and a second electrode lead protruding from the battery cell in opposite directions.

At least two electrode leads, among the electrode leads, may be connected to each other at the front side and the rear side of the battery cell stack to constitute an electrode lead assembly.

A low-voltage (LV) sensing assembly may be positioned on at least one of the first sensing block and the second sensing block, and the LV sensing assembly may be connected to the electrode lead assembly.

The LV sensing assembly may be include an LV connector, a connection member configured to connect the LV connector and the electrode leads, and joining plates positioned at one end of the connection member and joined to the electrode leads.

The first sensing block and the second sensing block may each have a slit, and the electrode leads may pass through the slit and be bent to constitute the electrode lead assembly.

The first sensing block and the second sensing block may each have a handling part for transporting the battery module, and the handling part may have a through port.

Another exemplary embodiment of the present disclosure provides a battery pack including: the battery module; a pack frame configured to accommodate the battery module; and a thermally conductive resin layer positioned between the battery module and a bottom portion of the pack frame. The elastic member may be opened at a lower side thereof, and a lower side of the battery cell stack may be exposed.

The lower side of the battery cell stack may be in contact with the thermally conductive resin layer.

Advantageous Effects

According to the embodiment of the present disclosure, the structure in which the lower side of the battery cell stack is exposed may simplify the heat transfer path and improve the cooling performance.

In addition, the structure in which the elastic member is continuously formed while surrounding the battery cell stack may suppress swelling of the battery cell and prevent the battery module from being deformed in the direction in which the battery cells are stacked.

In addition, the sensing blocks capable of guiding the high-voltage (HV) connection and the low-voltage (LV) connection and protecting the battery cell may be fixed by the elastic member.

The effects of the present disclosure are not limited to the aforementioned effects, and other effects, which are not mentioned above, will be clearly understood by those skilled in the art from the claims.

DETAILED DESCRIPTION

Figure 1:
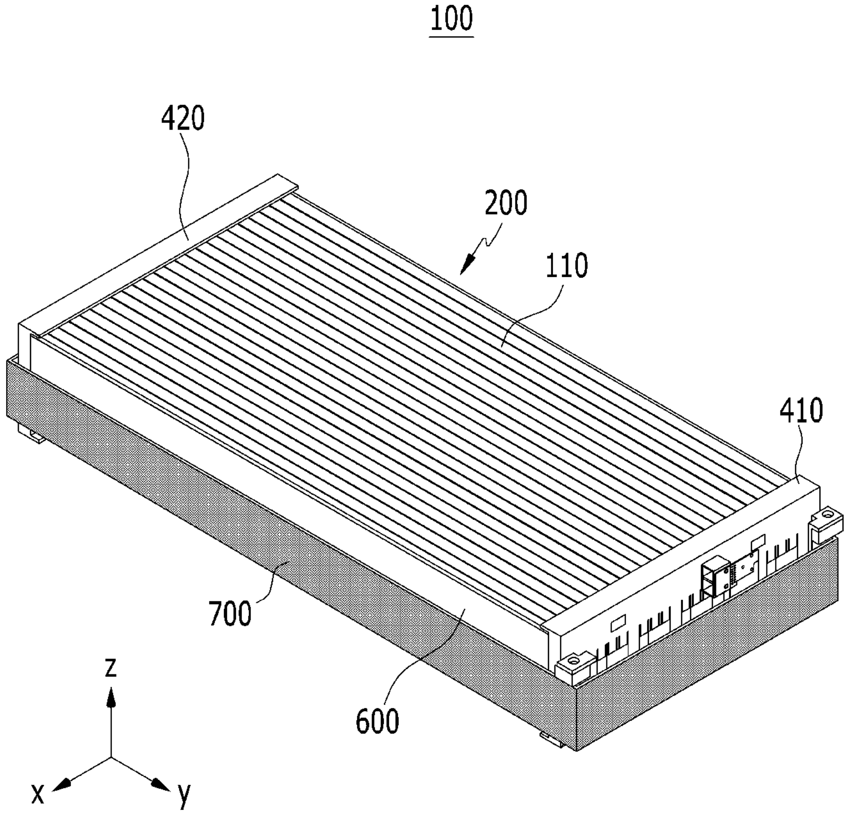
FIG. 1 is a perspective view illustrating a battery module according to an embodiment of the present disclosure.

Hereinafter, several exemplary embodiments of the present disclosure will be described in detail with reference to the accompanying drawings so that those with ordinary skill in the art to which the present disclosure pertains may easily carry out the exemplary embodiments. The present disclosure may be implemented in various different ways and is not limited to the embodiments described herein.

A part irrelevant to the description will be omitted to clearly describe the present disclosure, and the same or similar constituent elements will be designated by the same reference numerals throughout the specification.

In addition, a size and a thickness of each constituent element illustrated in the drawings are arbitrarily shown for convenience of description, but the present disclosure is not limited thereto. In order to clearly describe several layers and regions, thicknesses thereof are enlarged in the drawings. In the drawings, the thicknesses of some layers and regions are exaggerated for convenience of description.

In addition, when one component such as a layer, a film, a region, or a plate is described as being positioned "above" or "on" another component, one component can be positioned "directly on" another component, and one component can also be positioned on another component with other components interposed therebetween. On the contrary, when one component is described as being positioned "directly on" another component, there is no component therebetween. In addition, when a component is described as being positioned "above" or "on" a reference part, the component may be positioned "above" or "below" the reference part, and this configuration does not necessarily mean that the component is positioned "above" or "on" the reference part in a direction opposite to gravity.

Throughout the specification, unless explicitly described to the contrary, the word "comprise/include" and variations such as "comprises/includes" or "comprising/including" will be understood to imply the inclusion of stated elements, not the exclusion of any other elements.

Throughout the specification, the word "in a plan view" means when an object is viewed from above, and the word "in a cross-sectional view" means when a cross section made by vertically cutting an object is viewed from a lateral side.

Figure 2:
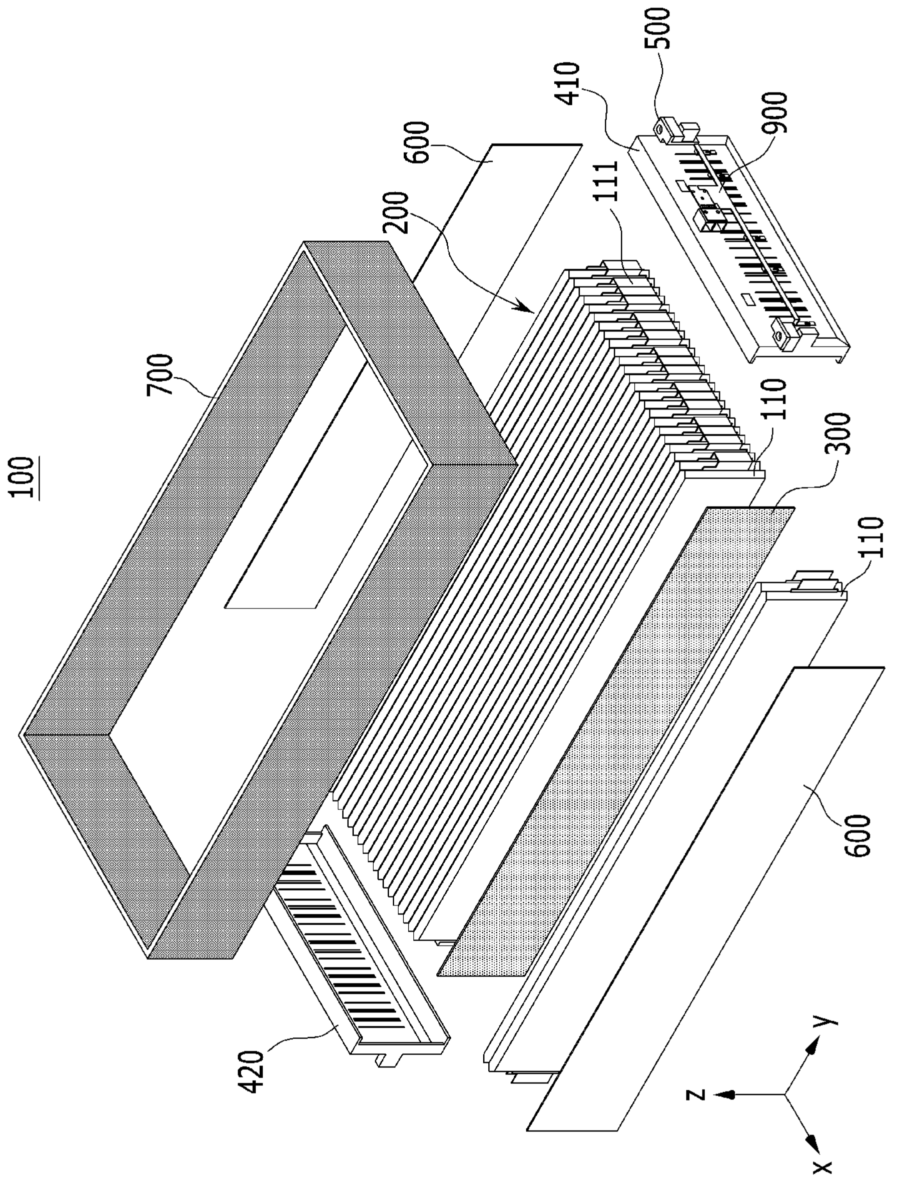
FIG. 2 is an exploded perspective view of the battery module in FIG. 1.
Figure 3:
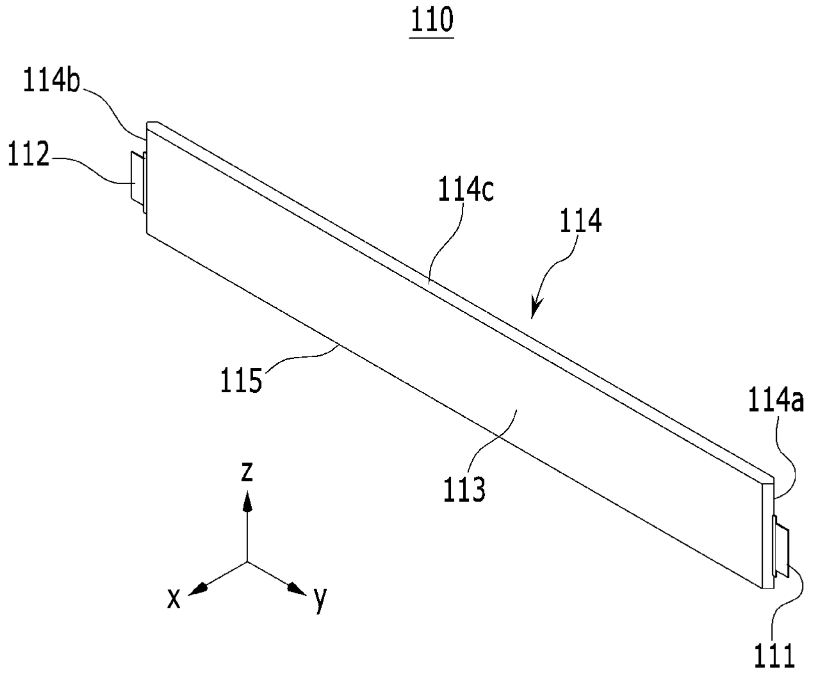
FIG. 3 is a perspective view illustrating a battery cell included in the battery module in FIG. 2.

FIG. 1 is a perspective view illustrating a battery module according to an embodiment of the present disclosure. FIG. 2 is an exploded perspective view of the battery module in FIG. 1. FIG. 3 is a perspective view illustrating battery cells included in the battery module in FIG. 2.

Referring to FIGS. 1 to 3, a battery module 100 according to an embodiment of the present disclosure includes: a battery cell stack 200 made by stacking a plurality of battery cells 110 including electrode leads 111 and 112; first and second sensing blocks 410 and 420 configured to respectively cover front and rear sides of the battery cell stack 200 from which the electrode leads 111 and 112 protrude; and an elastic member 700 configured to cover the first sensing block 410, the second sensing block 420, and two opposite lateral sides of the battery cell stack 200. In this case, the front side means a side of the battery cell stack 200 directed in a y-axis direction. The rear side means a side of the battery cell stack 200 directed in a −y-axis direction. The two opposite lateral sides respectively mean sides of the battery cell stack 200 directed in x-axis and −x-axis directions. In addition, the lower side means a side of the battery cell stack 200 directed in a −z-axis direction. The upper side means a side of the battery cell stack 200 directed in a z-axis direction. However, the above-mentioned terms are called for the convenience of description and may be changed depending on a position of a target object or a position of an observer. As described above, the front and rear sides of the battery cell stack 200 may be the sides at which the electrode leads 111 and 112 protruding from the battery cell 110 are positioned.

First, the battery cell 110 may be a pouch-type battery cell and provided in the form of a rectangular sheet structure. The protruding electrode leads of the battery cell 110 according to the present embodiment include protruding first and second electrode leads 111 and 112. Specifically, the battery cell 110 according to the present embodiment has a structure in which the first and second electrode leads 111 and 112 respectively protrude from one end 114*a* and the other end 114*b* while facing each other with respect to a cell main body 113. More specifically, the first and second electrode leads 111 and 112 are connected to an electrode assembly (not illustrated), and protrude from the electrode assembly (not illustrated) to the outside of the battery cell 110. The first and second electrode leads 111 and 112 have different polarities. For example, one of the first and second electrode leads 111 and 112 may be a positive electrode lead 111, and the other may be a negative electrode lead 112. That is, the positive electrode lead 111 and the negative electrode lead 112 may protrude in opposite directions with respect to one battery cell 110.

Meanwhile, the battery cell 110 may be manufactured by bonding two opposite ends 114*a* and 114*b* of a cell casing 114 and one side portion 114*c* connecting the two opposite ends 114*a* and 114*b* in a state in which the electrode assembly (not illustrated) is accommodated in the cell casing 114. In other words, the battery cell 110 according to the present embodiment may have three sealing parts. The sealing part is a structure sealed by a thermal bonding method or the like. The other side portion may be configured as a connection portion 115. The cell casing 114 may be configured by a laminated sheet including a resin layer and a metal layer.

The battery cell 110 may be provided in plural, and the plurality of battery cells 110 are stacked to be electrically connected to one another, thereby constituting the battery cell stack 200. In particular, as illustrated in FIGS. 1 and 2, the plurality of battery cells 110 may be stacked in a direction parallel to the x-axis. Therefore, the first and second electrode leads 111 and 112 may respectively protrude in the y-axis direction and the −y-axis direction. That is, the first and second electrode leads 111 and 112 may be positioned at the front and rear sides of the battery cell stack 200.

Hereinafter, the first and second sensing blocks according to the present embodiment will be described in detail with reference to FIGS. 4 and 5.

Figure 4:
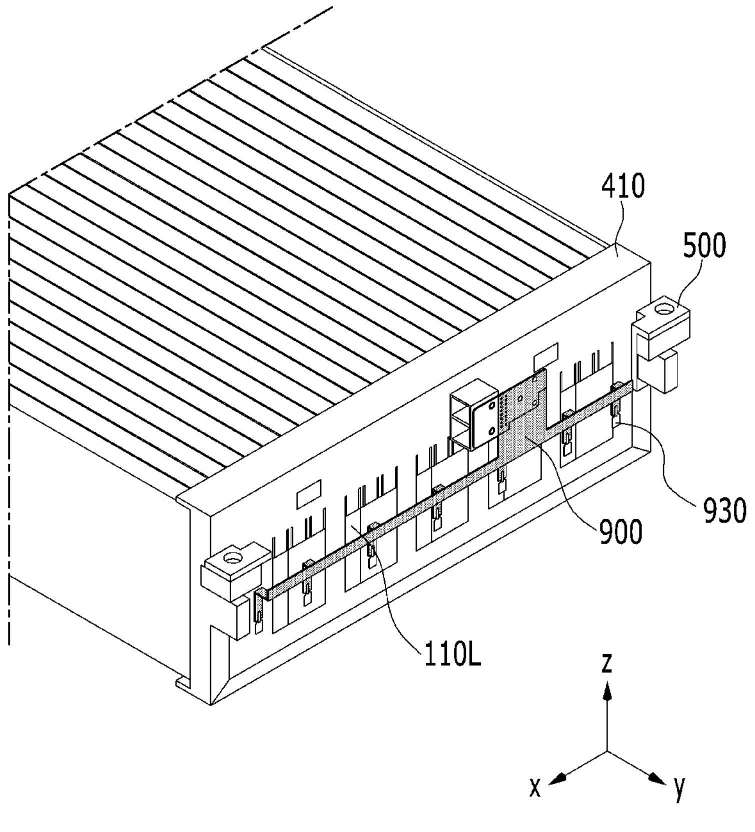
FIG. 4 is an enlarged partial perspective view of a front portion of the battery module in FIG. 1.
Figure 5:
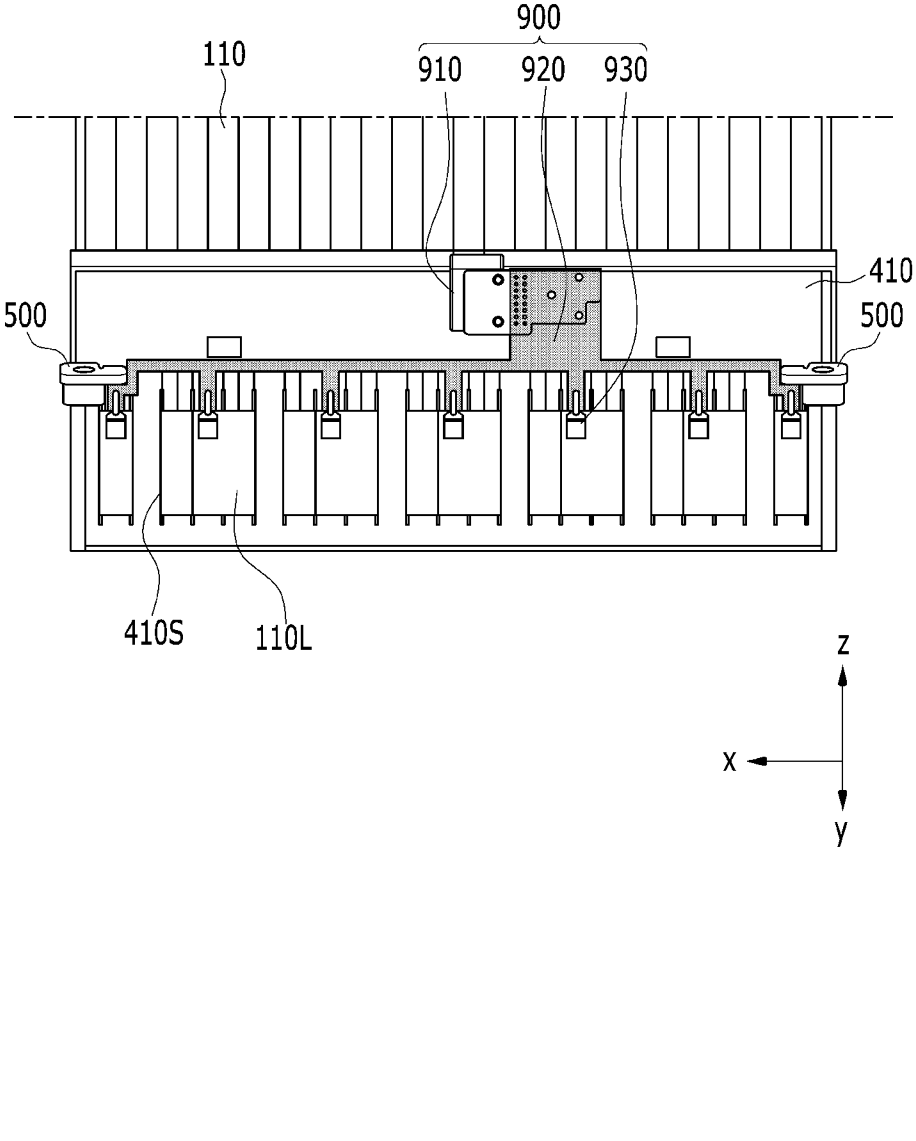
FIG. 5 is a view illustrating the front portion of the battery module in FIG. 4 when viewed from the front side.

FIG. 4 is an enlarged partial perspective view of a front portion of the battery module in FIG. 1. FIG. 5 is a view illustrating the front portion of the battery module in FIG. 4 when viewed from the front side. However, for the convenience of description, the elastic member 700 illustrated in FIG. 1 is not illustrated in FIGS. 4 and 5.

Referring to FIGS. 2 to 5, the first and second sensing blocks 410 and 420 respectively cover the front and rear sides of the battery cell stack 200 from which the electrode leads 111 and 112 protrude. More specifically, the first sensing block 410 may be positioned between the front side of the battery cell stack 200 and the elastic member 700. The second sensing block 420 may be positioned between the rear side of the battery cell stack 200 and the elastic member 700. The elastic member 700 will be described below.

The first and second sensing blocks 410 and 420 may each be made of an electrically insulating material, e.g., a plastic material, a polymer material, or a composite material. In addition, the first and second sensing blocks 410 and 420 may each be provided in the form of a basket. The first and second sensing blocks 410 and 420 may respectively cover the front and rear sides of the battery cell stack 200.

Hereinafter, to prevent the repetitive description, the description will be made, focusing on the first sensing block 410 illustrated in FIGS. 4 and 5. However, the same or similar structure may also be applied to the second sensing block 420.

As described above, the electrode leads 111 and 112 may be respectively positioned at the front and rear sides of the battery cell stack 200. The first sensing block 410 may have a slit 410S, and the electrode leads 111 and 112 may pass through the slit 410S when the first sensing block 410 is disposed. Next, at least two electrode leads 111 and 112 may be bent and joined, thereby constituting an electrode lead assembly 110L. Specifically, the electrode leads 111 and 112, which protrude in the same direction from the adjacent battery cells 110, may be bent in a direction perpendicular to the direction in which the electrode leads 111 and 112 protrude and joined to each other, thereby constituting the electrode lead assembly 110L. Therefore, one surface of the electrode lead assembly 110L may be disposed in a direction perpendicular to the direction (y-axis direction) in which the electrode leads 111 and 112 protrude from the battery cell 110. In this case, the electrode leads having the same polarities may be joined to each other. The electrode leads having different polarities may be joined to each other. In other words, the electrode leads having the same polarity may be joined to each other to implement parallel connection between the battery cells 110. The electrode leads having different polarities may be joined to each other to implement series connection between the battery cells 110. This configuration may change depending on design of the battery module.

Meanwhile, the electrode leads 111 and 112 of the battery cells 110 disposed at outer portions of the battery cell stack

200 may be connected to terminal busbars 500. Unlike the configuration in the related art in which the electrode leads of the battery module are connected to one another by means of the busbars, the electrode leads 111 and 112 according to the present embodiment may be joined to one another, and some of the electrode leads 111 and 112 may be connected to the terminal busbar 500, thereby defining high-voltage (HV) connection. In this case, the HV connection means the connection of a power source for supplying electric power, i.e., the connection between the battery cells or the connection between the battery modules. Unlike the configuration in the related art in which the electrode leads of the battery module are connected to one another by means of the busbars, the electrode leads 111 and 112 according to the present embodiment may be joined to one another, and some of the electrode leads 111 and 112 may be connected to the terminal busbar 500, thereby defining the HV connection. Therefore, in the HV connection structure according to the present embodiment, it is possible to remove the busbar, and the busbar frame on which the busbar is mounted.

Meanwhile, the battery module 100 according to the present embodiment may include a low-voltage (LV) sensing assembly 900 configured to transmit information on a voltage of the battery cell. The LV sensing assembly 900 may be positioned on at least one of the first sensing block 410 and the second sensing block 420. Specifically, the LV sensing assembly 900 may be positioned on a side opposite to the side of the first sensing block 410 facing the battery cell stack 200. Likewise, although not specifically illustrated, in some instances, the LV sensing assembly 900 may be positioned at a side opposite to the side of the second sensing block 420 facing the battery cell stack 200.

The LV sensing assembly 900 is provided to implement low-voltage (LV) connection. In this case, the LV connection means a sensing connection for detecting and controlling the voltage of the battery cell. The information on voltage and temperature of the battery cell 110 may be transmitted to an external battery management system (BMS) through the LV sensing assembly 900. The LV sensing assembly 900 may be connected to the electrode lead assembly 110L.

The LV sensing assembly 900 may include an LV connector 910, a connection member 920 configured to connect the LV connector 910 and the electrode leads 111 and 112, and joining plates 930 positioned at one end of the connection member 920 and joined to the electrode leads 111 and 112.

The LV connector 910 may be configured to transmit and receive signals to and from an external control device in order to control the plurality of battery cells 110. The connection member 920 may be a flexible printed circuit board (FPCB) or a flexible flat cable (FFC). The information on the voltage and temperature measured by the plurality of battery cells 110 may be transmitted to the external battery management system (BMS) through the connection member 920 and the LV connector 910. That is, the LV sensing assembly 900 including the LV connector 910 and the connection member 920 may detect and control overvoltage, overcurrent, overheating, and the like of each of the battery cells 110. The joining plate 930 may be positioned at one end of the connection member 920 and made of a metallic material having electrical conductivity. The joining plates 930 are joined to the electrode leads 111 and 112, such that the connection member 920 may be electrically and physically connected to the electrode leads 111. Specifically, the one side of the joining plate 930 may penetrate the connection member 920 and then be bent, such that the joining plate 930 may be coupled to the connection member 920. The other side of the joining plate 930 may have a plate shape and be joined to each of the electrode leads 111 and 112, particularly, by welding.

Meanwhile, as described above, the battery cells 110 may be stacked in the x-axis direction, thereby constituting the battery cell stack 200. Therefore, the electrode leads 111 and 112 may respectively protrude in the y-axis direction and the −y-axis direction. In this case, as described above, the at least two electrode leads 111 and 112 may be bent and joined to each other, thereby constituting the electrode lead assembly 110L. The LV sensing assembly 900 and the electrode leads 111 and 112 may be connected to one another as the joining plates 930 of the LV sensing assembly 900 are connected directly to the electrode lead assembly 110L. According to the battery module 100 according to the present embodiment, the HV connection and the LV connection may be implemented at one time without being separately implemented. Therefore, it is possible to expect productivity improvement. Further, the components such as the busbar frame may be eliminated, which makes it possible to manufacture the battery module 100 having a more compact configuration.

The first and second sensing blocks 410 and 420 according to the present embodiment may guide the HV connection and the LV connection of the battery module 100 and serve to protect the battery cells 110 because the first and second sensing blocks 410 and 420 have predetermined strength.

The method of joining the electrode leads 111 and 112 to provide the electrode lead assembly 110L or the method of joining the electrode lead assembly 110L and the joining plate 930 is not particularly limited as long as the method may implement the electrical connection. For example, welding may be applied. In addition, the description has been made, focusing on the electrode leads 111 and 112 protruding in the y-axis direction. However, the structure including the electrode lead assembly and the LV sensing assembly 900 may also be implemented in the case of the electrode leads 111 and 112 protruding in the −y-axis direction.

Meanwhile, as illustrated in FIGS. 1 and 2, the elastic member 700 according to the present embodiment may cover the electrode leads 111 and 112, i.e., the electrode lead assembly 110L. The electrode lead assembly 110L is structurally, is positioned outside the first sensing block 410 or the second sensing block 420. The elastic member 700 may cover the electrode lead assembly 110L, thereby protecting the electrode lead assembly 110L from an external environment.

Hereinafter, the elastic member 700 will be described in detail.

Referring to FIGS. 1 and 2, the elastic member 700 according to the present embodiment may be continuously formed along the front side, the rear side, and the two opposite lateral sides of the battery cell stack 200. More specifically, the elastic member 700 may be continuously formed along the first sensing block 410, the second sensing block 420, and the two opposite lateral sides of the battery cell stack 200. During a process in which the plurality of battery cells 110 are repeatedly charged and discharged, the electrolyte in the battery cell is decomposed, and gas is produced. For this reason, there may occur a situation in which the battery cell 110 swells, i.e., swelling. In particular, the battery cells 110 may each swell in the direction in which the battery cells 110 are stacked (the direction parallel to the x-axis). In the present embodiment, the elastic member 700 having elasticity is continuously formed along the front side, the rear side, and the two opposite lateral sides of the battery cell stack 200. Therefore, it is possible to suppress swelling of the battery cell 110 and minimize deformation of the battery module 100 in the direction in which the battery cells 110 are stacked.

In addition, the battery module according to the present embodiment may form a module-less structure in which the module frame and the endplate are removed. The elastic member 700 may replace the module frame or the endplate and maintain and fix the shape of the battery module 100 according to the present embodiment. In particular, the first sensing block 410, the battery cell stack 200, and the second sensing block 420 may be fixed together by the elastic member 700. Because the module frame and the endplate are eliminated, it is not necessary to perform a complicated process, which requires precise control, such as a process of accommodating the battery cell stack 200 in the module frame or a process of assembling the module frame and the endplate. In addition, a weight of the battery module 100 may be greatly reduced to the extent that the module frame and the endplate are eliminated. In addition, because the module frame is eliminated, the battery module 100 according to the present embodiment is advantageous in reworkability during the process of assembling a battery pack. This configuration according to the present embodiment may be compared to the configuration in the related art in which the battery module having the module frame cannot be implemented again because of the welding structure of the module frame even though a defect occurs.

In addition, the elastic member 700 is opened at the upper and lower sides thereof, such that the upper and lower sides of the battery cell stack 200 are exposed to the outside. This configuration may effectively dissipate the heat and improve the cooling performance in comparison with a configuration in which the battery cell stack is surrounded by the module frame. In this case, the upper side means a side of the battery cell stack 200 directed in the z-axis direction. The lower side means a side of the battery cell stack 200 directed in the −z-axis direction.

Meanwhile, a material of the elastic member 700 is not particularly limited as long as the material provides a predetermined elastic force. For example, the elastic member 700 may be made of at least one of composite materials such as polymer synthetic materials and fiber-reinforced plastic (FRB) and metal alloys.

Figure 6:
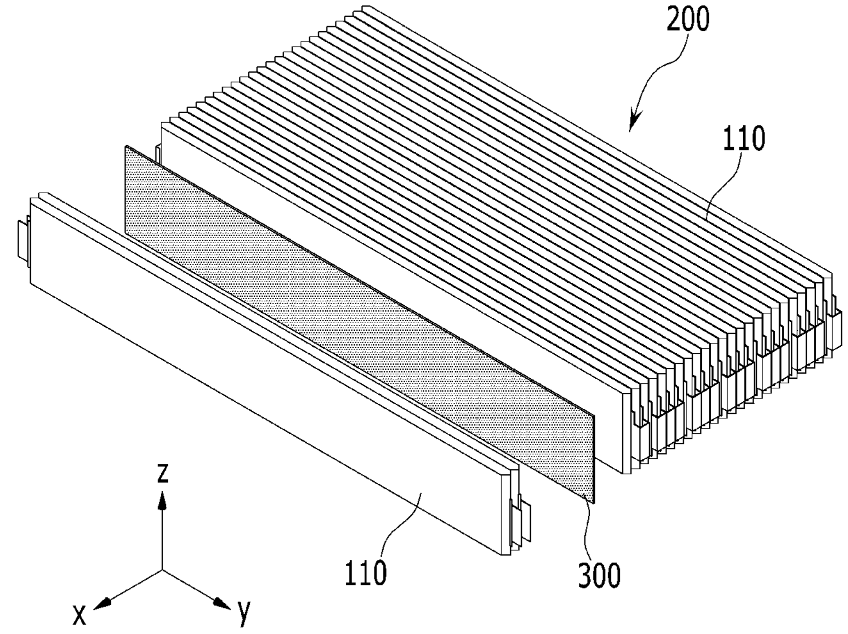
FIG. 6 is a perspective view illustrating a battery cell stack and a cooling fin included in the battery module in FIG. 2.

FIG. 6 is a perspective view illustrating the battery cell stack and a cooling fin included in the battery module in FIG. 2.

Referring to FIGS. 2 and 6, the battery module 100 according to the present embodiment may further include cooling fins 300 positioned between the battery cells 110. FIGS. 2 and 6 illustrate only one cooling fin 300. The cooling fins 300 according to the present embodiment may be positioned in all the portions between the battery cells 110.

The cooling fin 300 may be made of a metallic material having high thermal conductivity. The material is not specifically limited. For example, the cooling fin may be made of aluminum (Al). The cooling fins 300 having thermal conductivity may be disposed and directly attached between the battery cells 110, thereby increasing a cooling area. Therefore, the cooling performance is improved.

Meanwhile, as described above, the elastic member 700 is opened at the lower side thereof, such that the lower side of the battery cell stack 200 is exposed to the outside. The cooling fin 300 according to the present embodiment may protrude from the lower side of the battery cell stack 200. Therefore, the cooling fin 300 according to the present embodiment may be in direct contact with a thermally conductive resin layer to be described below. Because the cooling fins 300 disposed between the battery cells 110 may be in direct contact with the thermally conductive resin layer, thereby maximizing performance in discharging heat from the battery module.

Figure 7:
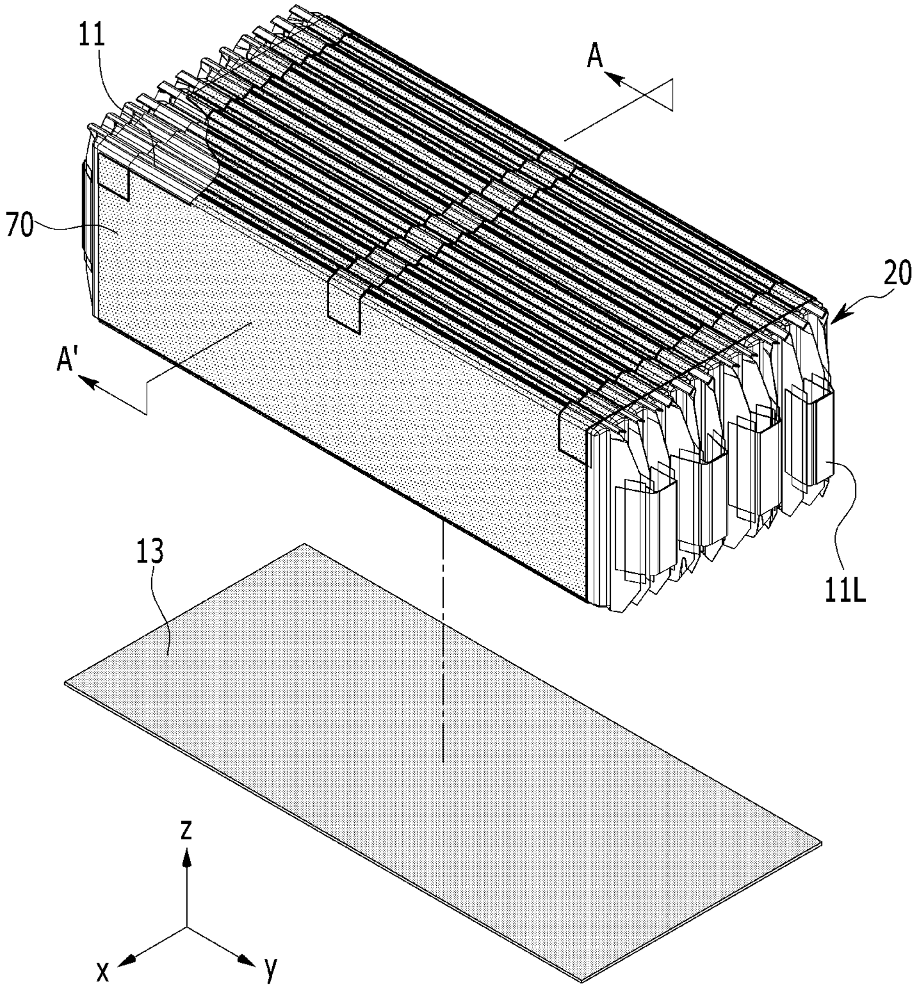
FIG. 7 is a perspective view illustrating a battery module according to a comparative example of the present disclosure.
Figure 8:
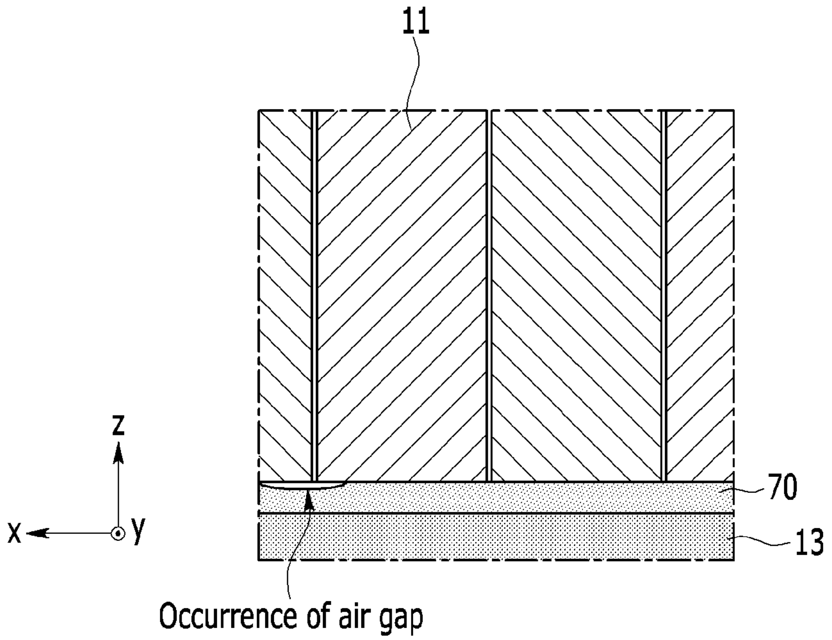
FIG. 8 is a cross-sectional view illustrating a cross-section taken along cutting line A-A' in FIG. 7.

FIG. 7 is a perspective view illustrating a battery module according to a comparative example of the present disclosure. FIG. 8 is a cross-sectional view illustrating a cross-section taken along cutting line A-A' in FIG. 7.

Referring to FIGS. 7 and 8, a battery module 10 according to a comparative example of the present disclosure includes: a battery cell stack 20 made by stacking a plurality of battery cells 11; and an elastic member 70 configured to surround the battery cell stack 20. In this case, unlike the battery module 100 according to the present embodiment, the elastic member 70 surrounds an upper side, a lower side, and two opposite lateral sides of the battery cell stack 20. That is, the elastic member 70 surrounds the sides, except for the front and rear sides of the battery cell stack 20 at which electrode leads 11L are provided. In this case, likewise, the front side means a side of the battery cell stack 20 directed in the y-axis direction. The rear side means a side of the battery cell stack 20 directed in the −y-axis direction. The two opposite lateral sides respectively mean sides of the battery cell stack 20 directed in the x-axis and −x-axis directions. In addition, the lower side means a side of the battery cell stack 20 directed in the −z-axis direction. The upper side means a side of the battery cell stack 20 directed in the z-axis direction. The electrode leads 11L of the battery cell 11 may be positioned at front and rear sides of the battery cell stack 20.

Specifically, although not illustrated, the battery cell stack 20 may be accommodated in the module frame or mounted directly on the pack frame without the module frame. In both the cases, the thermally conductive resin layer 13 may be positioned at the lower side of the battery cell stack 20.

In the comparative example, as illustrated in FIG. 8, the heat generated from the battery cells 11 is transferred to a thermally conductive resin layer 13 through the elastic member 70. In addition, an element, such as an air gap which hinders heat transfer, may occur between the battery cell 11 and the elastic member 70. In contrast, in the battery module 100 according to the present embodiment, the elastic member 700 is opened at the lower side and covers the front side, the rear side, and the two opposite lateral sides of the battery cell stack 200, such that the lower side of the battery cell stack 200 is exposed. Therefore, the battery cell 110 may be in direct contact with the thermally conductive resin layer to be described below. The elastic member 700 according to the present embodiment differs from the elastic member 70 according to the comparative example in that the elastic member 700 covers the front and rear sides of the battery cell stack 200 at which the first and second electrode leads 111 and 112 are positioned, instead of covering the upper and lower sides of the battery cell stack 200. The heat transfer path is simplified, and there is no element such as an air gap that hinders the heat transfer. Therefore, the battery module according to the present embodiment has cooling and heat dissipation performance improved in comparison with the battery module according to the comparative example.

In addition, the elastic member 700 according to the present embodiment may be positioned to cover the first and second sensing blocks 410 and 420, thereby fixing the first and second sensing blocks 410 and 420 to the battery cell stack 200. In contrast, the comparative example is not structurally stable because the elastic member 70 hardly fixes the sensing blocks even though the sensing blocks are disposed at the front and rear sides of the battery cell stack 20. A fixing device may be additionally disposed, but a separate space and a manufacturing process are inevitably required.

Meanwhile, referring back to FIGS. 1 and 2, the battery module 100 according to the present embodiment may further include plate-shaped lateral pads 600 positioned between the elastic member 700 and the two opposite lateral sides of the battery cell stack 200. The module frame and the endplate are eliminated, and the lateral pads 600 may be disposed at the two opposite lateral sides of the battery cell stack 200. The lateral pads 600 may improve rigidity of the battery module 100 and perform a buffer function between the battery cell 110 and the elastic member 700. A pad made of a foam material may be applied as the lateral pad 600.

Figure 9:
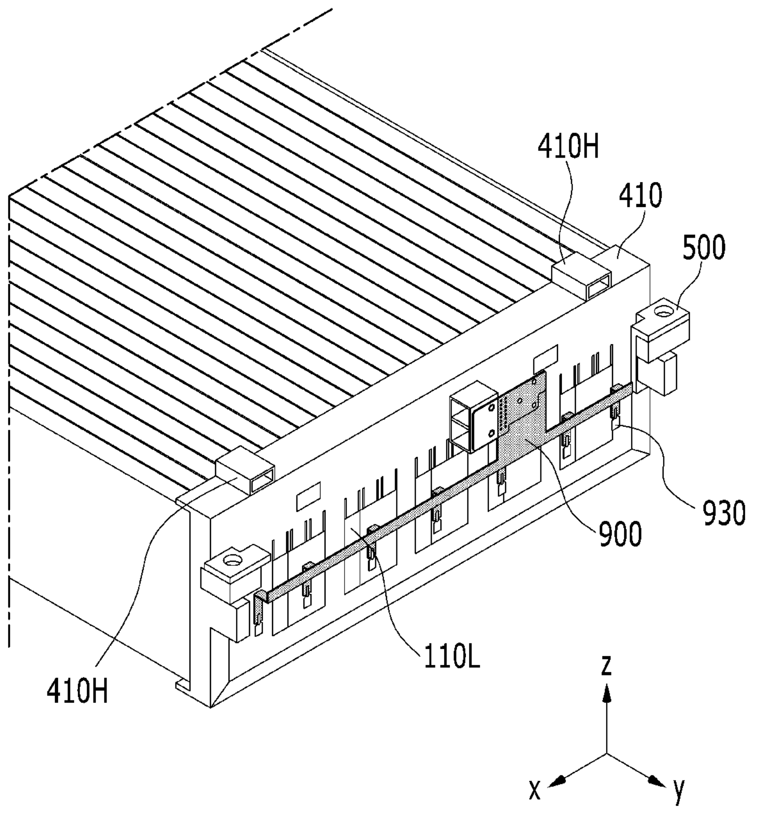
FIG. 9 is an enlarged partial perspective view of a front portion of a battery module according to another embodiment of the present disclosure.

FIG. 9 is an enlarged partial perspective view of a front portion of a battery module according to another embodiment of the present disclosure.

Referring to FIG. 9, the battery module according to another embodiment of the present disclosure may include the first sensing block 410 and the LV sensing assembly 900. The repetitive description of the first sensing block 410 will be omitted.

The first sensing block 410 according to the present embodiment may include handling parts 410H for moving the battery module. Specifically, the handling part 410H may protrude upward from the first sensing block 410 and have a through port formed at a center thereof. The number of handling parts 410H is not particularly limited. The single handling part 410H may be provided or the handling part 410H may be provided in plural.

Specifically, although not illustrated, the second sensing block (not illustrated) may have a structure similar to the handling part 410H of the first sensing block 410.

In the battery module in the related art, a handling structure for transporting and moving the battery module is provided on the module frame or the endplate. In contrast, as described above, because the battery module according to the present embodiment has the module-less structure in which the module frame and the endplate are removed, the handling parts 410H, which are the structures for transporting and moving the battery module, may be provided on the first sensing block 410 and the second sensing block 420. However, FIG. 9 illustrates an exemplary structure of the handling part 410H. Holes may be formed through the first and second sensing blocks without a protruding portion.

Hereinafter, a battery pack according to the embodiment of the present disclosure will be described in detail with reference to FIGS. 10 and 11.

Figure 10:
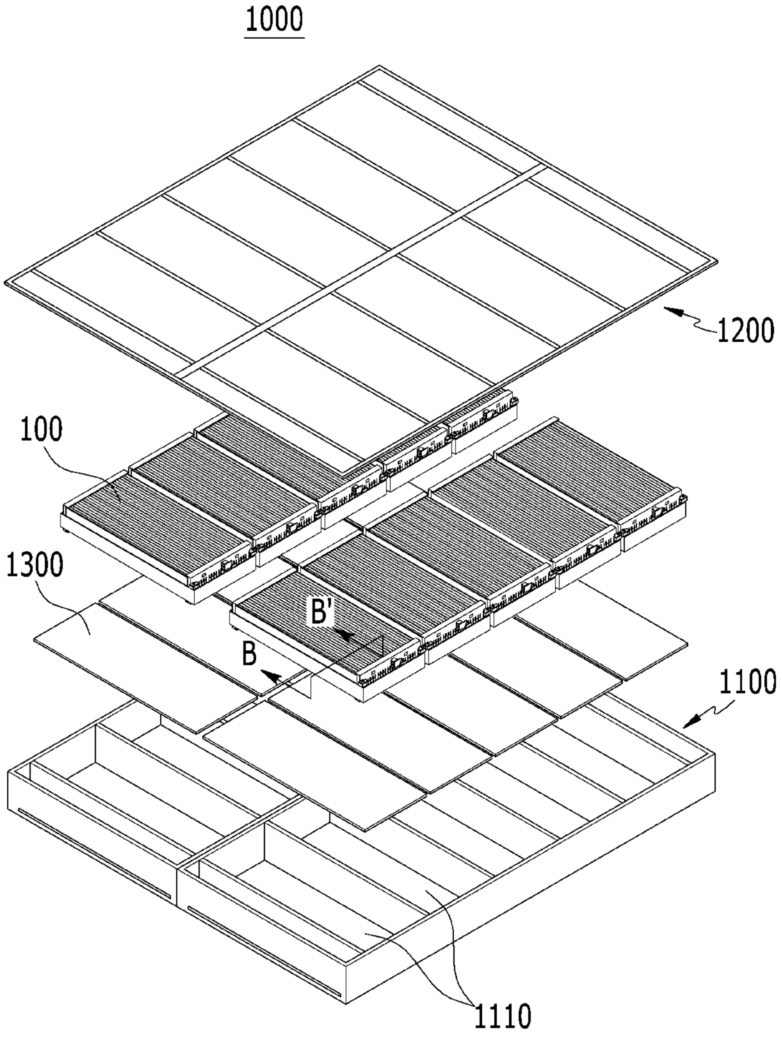
FIG. 10 is an exploded perspective view illustrating a battery pack according to an embodiment of the present disclosure.

FIG. 10 is an exploded perspective view illustrating a battery pack according to the embodiment of the present disclosure. FIG. 11 is a cross-sectional view illustrating a cross-section taken along cutting line B-B' in FIG. 10. In this case, FIG. 11 illustrates a cross-section on the assumption that the battery modules 100 illustrated in FIG. 10, a thermally conductive resin layer 1300, and a bottom portion 1110 of a pack frame 1100 are in contact with one another, unlike the configuration illustrated in FIG. 10.

Figure 11:
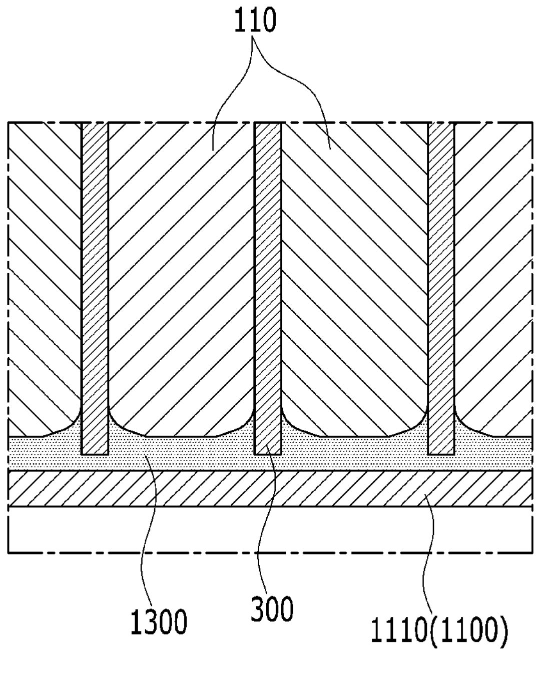
FIG. 11 is a cross-sectional view illustrating a cross-section taken along cutting line B-B' in FIG. 10.

Referring to FIGS. 10 and 11, a battery pack 1000 according to the embodiment of the present disclosure includes: the battery modules 100; the pack frame 1100 configured to accommodate the battery modules 100; and the thermally conductive resin layer 1300 positioned between the battery module 100 and the bottom portion 1110 of the pack frame 1100.

As described above, the battery module 100 includes the battery cell stack 200 and the elastic member 700. The repetitive description of the battery module 100 will be omitted.

The battery pack 1000 may further include an upper cover 1200 configured to cover the pack frame 1100. That is, the plurality of battery modules 100 may be accommodated between the pack frame 1100 and the upper cover 1200.

The thermally conductive resin layer 1300 may be formed by applying thermally conductive resin onto the bottom portion 1110. Specifically, the thermally conductive resin layer 1300 may be formed by applying the thermally conductive resin onto the bottom portion 1110, positioning the battery module 100 according to the present embodiment on the thermally conductive resin, and then curing the thermally conductive resin.

The thermally conductive resin may be made of a thermally conductive bonding material. Specifically, the thermally conductive resin may be made of at least one of silicone, urethane, and acrylic. The thermally conductive resin has a liquid phase at the time of the application and is cured after the application. The thermally conductive resin may serve to fix the plurality of battery cells 110 constituting the battery cell stack 200. In addition, the thermally conductive resin is excellent in thermal conduction and quickly transfers the heat generated from the battery module 100 to the bottom portion 1110, which makes it possible to prevent overheating of the battery pack 1000.

Referring to FIGS. 2, 10, and 11, as described above, the battery module 100 according to the present embodiment may have the module-less structure in which the module frame and the endplate are eliminated. The elastic member 700 is opened at the lower side thereof, such that the lower side of the battery cell stack 200 is exposed. In the battery pack 1000, the lower side of the battery cell stack 200 is in contact with the thermally conductive resin layer 1300. Therefore, the heat generated from the battery cell 110 may be transferred directly to the bottom portion 1110 of the pack frame 1100 through the thermally conductive resin layer 1300. In the case of the model in the related art having the module frame or the model including the elastic member 70 illustrated in FIG. 7, the heat generated from the battery cell is discharged to the outside of the battery module through several layers, and the heat transfer path is complicated. That is, it is difficult to effectively transfer the heat generated from the battery cell, and fine air layers such as air gaps formed between the layers may hinder the heat transfer. In contrast, as illustrated in FIG. 11, since the battery cell 110 according to the present embodiment is in direct contact with the thermally conductive resin layer 1300, the heat transfer path toward the lower side of the battery module 100 may be simplified, and the likelihood of the occurrence of air layers such as air gaps may be reduced. Therefore, it is possible to improve the performance in cooling the battery module 100 and the battery pack 1000 including the battery module 100.

In addition, the cooling fin 300 according to the present embodiment extends from the lower side of the battery cell stack 200 and is in contact with the thermally conductive resin layer 1300. Because the lower side of the battery cell stack 200 is exposed, the cooling fin 300 positioned between the battery cells 110 may be in direct contact with the thermally conductive resin layer 1300 on the bottom portion 1110. The cooling fin 300, which faces the battery cell 110, may be in direct contact with the thermally conductive resin layer 1300, thereby improving the performance in discharging heat.

Meanwhile, in the module-less structure in which the module frame is eliminated, it is essential to fix the exposed battery cell 110 to ensure the structural safety. Therefore, in the battery pack 1000 according to the present embodiment, the battery cells 110 constituting the battery module 100 are fixed while being in contact with the thermally conductive resin layer 1300, thereby improving structural safety.

In addition, an unnecessary cooling structure may be eliminated, thereby reducing costs. In addition, the number of components disposed in a height direction of the battery pack 1000 is reduced, which makes it possible to improve the spatial utilization and increase the capacity or output of the battery module.

In the present embodiment, the terms 'front,' 'rear,' 'left,' 'right,' 'upper,' and 'lower' have been used to indicate the directions. However, these terms may be changed depending on a position of a target object or a position of an observer.

One or more battery modules according to the present embodiment may be mounted together with various types of control and protection systems such as a battery management system (BMS), a cooling system, and the like, thereby constituting the battery pack.

The battery module or the battery pack may be applied to the various devices. Specifically, the battery module or the battery pack may be applied to transportation means such as electric bicycles, electric vehicles, hybrid vehicles, and the like, but the present disclosure is not limited thereto. The battery module or the battery pack may be applied to various devices capable of using the secondary battery.

Although preferred examples of the present disclosure have been described in detail hereinabove, the right scope of the present disclosure is not limited thereto, and many variations and modifications of those skilled in the art using the basic concept of the present disclosure, which is defined in the following claims, will also belong to the right scope of the present disclosure.

DESCRIPTION OF REFERENCE NUMERALS

100: Battery module
200: Battery cell stack
410: First sensing block
420: Second sensing block
700: Elastic member

The invention claimed is:

1. A battery module comprising:

a battery cell stack in which a plurality of battery cells including electrode leads are stacked;

a first sensing block and a second sensing block configured to respectively cover a front side and a rear side of the battery cell stack from which the electrode leads protrude;

an elastic member configured to cover the first sensing block, the second sensing block, and two opposite lateral sides of the battery cell stack, and cooling fins between the battery cells, a pack frame configured to accommodate the battery module; and a thermally conductive resin layer positioned between the battery module and a bottom portion of the pack frame, wherein the cooling fins protrude from a lower side of the battery cell stack to be in direct contact with the thermally conductive resin layer below the battery module.

2. The battery module of claim 1, wherein the elastic member is continuously formed along the first sensing block, the second sensing block, and the two opposite lateral sides of the battery cell stack.

3. The battery module of claim 1, wherein an upper side and the lower side of the battery cell stack are exposed.

4. The battery module of claim 1, wherein the battery module further comprises lateral pads positioned between the elastic member and the two opposite lateral sides of the battery cell stack.

5. The battery module of claim 1, wherein the electrode leads comprise a first electrode lead and a second electrode lead protruding from the battery cell in opposite directions.

6. The battery module of claim 1, wherein at least two electrode leads among the electrode leads are connected to each other at the front side and the rear side of the battery cell stack to constitute an electrode lead assembly.

7. The battery module of claim 6, wherein a low-voltage (LV) sensing assembly is positioned on at least one of the first sensing block and the second sensing block, and the LV sensing assembly is connected to the electrode lead assembly.

8. The battery module of claim 6, wherein the first sensing block and the second sensing block each have a slit, and the electrode leads pass through the slit and are bent to constitute the electrode lead assembly.

9. The battery module of claim 1, wherein the first sensing block and the second sensing block each have a handling part for transporting the battery module, and the handling part has a through port.

10. The battery module according to claim 1;

wherein the elastic member is opened at a lower side thereof, and the lower side of the battery cell stack is exposed.

11. The battery module of claim 1, wherein the lower side of the battery cell stack is in contact with the thermally conductive resin layer.

12. The battery module of claim 1, wherein:

the first sensing block, the battery cell stack, and the second sensing block are fixed together by the elastic member.

13. The battery module of claim 7, wherein:

the LV sensing assembly includes an LV connector, a connection member configured to connect the LV connector and the electrode leads, and joining plates positioned at one end of the connection member and joined to the electrode leads.

* * * * *